Patented Mar. 13, 1934

1,950,956

UNITED STATES PATENT OFFICE 1,950,956

METHOD OF COATING CHLORAMINE AND PRODUCT THEREOF

Warner F. Wilhelm, Chicago, Ill., assignor to Marshall Field & Company, Chicago, Ill., a corporation of Illinois No Drawing. Application October 19, 1931, Serial No. 569,859

10 Claims. (Cl. 23—243)

This invention relates to chemicals, and particularly to a method of treating chemicals whereby they are protected against reaction, inter-action, decomposition or other change until such action is desired.

It has for one object, therefore, to provide a treatment whereby premature action of a chemical is prevented. Another object is particularly to prevent action of an unstable or highly reactive chemical until such action is desired. This is of particular importance in connection with materials which would liberate gaseous compounds. It is one of the objects of the invention, therefore, particularly to provide a method of treatment for protecting such material and for preventing its or their action until the desired time. It is an object of the invention to provide a treatment for preventing premature action of the chemical so treated, whether the chemical is to be used alone or stored or mixed with other materials with which it must be associated for action or reaction at a later time, and it is a further object of the invention to provide a protective treatment which in one form constitutes a protective covering about a particle or group of particles of the material and to provide a covering of such nature that it can be broken or destroyed when the material is brought into association in which it is desired to bring about the reaction.

The coating of this invention is of a non-reactive material, that is to say, of material which will not react with the chemical being protected, and which will not react with other materials with which it may be brought into contact prior to the time of use, when it is desired to have the reaction take place.

In one form my method may be carried out generally as follows: First, the chemical which is to be protected is preferably reduced to particles of generally uniform size (this is not essential but is usually the most convenient) and, second, the particles of chemical are agitated in some sort of a device such as a coating pan, which is made of a material non-reactive with respect to the chemical being treated, and, third, as the particles are moved in the receptacle, the material to form the protective coating is poured, sprayed or otherwise deposited upon the particles of chemical in such manner as to form a protective film or coating about each of the particles. The protective coating is preferably applied in the form of a solution or mixture of the coating substance, and some carrying liquid which, when it has evaporated, leaves the coating in place. Of course, more than one application of the coating material may be made to produce a coating of greater or less thickness as the nature of the chemical or the use to which it is to be put may require. After the liquid which carries the coating material has evaporated and the coating itself is dry, the chemical may thereafter be treated in any suitable manner, either being stored in the form in which it is, with the particles separate, or groups of the particles may be formed together, as for example, in a tablet, either alone or with the admixture of other chemicals or materials and the chemical which has been protected may itself be dealt within in any other desired manner without fear of its premature action, and it will remain inert and stable until it is brought into contact with some material or effect which will break or remove the protective coating, at which time it is again freed for action.

One specific example of a material treated by my method is given below merely as an example.

(1) Chloramine in dry form is so treated as to reduce its particles to a substantially uniform size, for example, so as to pass through a No. 60 sieve and to be retained upon a No. 80 sieve. The chloramine may be pure or it may be mixed with a small quantity of salt or other material as a diluent. The chloramine is granulated and sieved to size, as above mentioned;

(2) The dry granules of chloramine are placed in a coating pan or receptacle which is rotated or moved in any suitable manner to cause movement of the granules of chloramine;

(3) There is sprayed upon the granules a solution of sodium stearate in purified chloroform and some purified sodium carbonate may here be added to the spray mixture. Instead of chloroform some other solvent for the sodium stearate might be used. An aqueous solvent might be used or carbon tetrachloride or other solvents;

(4) After the solution has been sprayed upon the moving granules of chloramine, the chloroform evaporates and leaves a coating of sodium stearate upon the granules. These may be then stored and will remain substantially stable so long as the coating remains intact upon them or they may be formed into tablets or mixed with other ingredients.

One posible use and association of the chloramine which has been treated to give it a protective coating in the manner set out above is in the following association: The chloramine so treated is mixed with a quantity of Rochelle salts and chlorinated starch and talc and this mixture is formed into tablets by a machine or otherwise, in any suitable manner. The fact that the chloramine has been treated by the process of this invention to give it a protective covering prevents its reacting with the starch which would otherwise be the case. The starch in this particular combination serves the purpose of making the tablet disintegrate when the latter is brought into contact with moisture and thus the chloramine and other material in the tablet is freed for adequate reaction. If it were not for the presence of the protective covering on the chloramine, this reaction would take place prematurely and the chloramine and the other ingredients could not be combined so as to be of any use, since they would inevitably react upon each other, either slowly or rapidly, and thus they could not be stored or transported and could only be used almost immediately upon being made. Chloramine is a particularly difficult substance with which to deal generally and especially when mixed with other ingredients, because when mixed with water, and particularly when mixed with water and organic matter, it liberates gas, and the tablet formed of chloramine, starch and Rochelle salt, which is set forth above as an example of my process and a product made by my process, is something which it has heretofore been impossible to make. The sodium stearate coating also acts to protect the chloramine from dirt, dust, and other foreign matter which might operate to decompose the chloramine. Thus both my process and the particular product mentioned are new.

This invention is intended to include the use of commercial sodium stearate which may not be absolutely pure as pure sodium stearate is relatively expensive for many commercial uses.

I claim:

1. A composition of matter comprising chloramine and a protective coating of sodium stearate on said chloramine.

2. A tablet comprising chloramine particles and a protective coating of sodium stearate on said chloramine particles.

3. A tablet comprising chloramine particles and other ingredient and a protective coating of sodium stearate on said chloramine particles.

4. A composition of matter comprising chloramine and starch and a protective coating of sodium stearate on said chloramine.

5. A composition of matter comprising chloramine and chlorinated starch and a protective coating of sodium stearate on said chloramine.

6. A composition of matter comprising chloramine and a diluent and a protective coating of sodium stearate on said chloramine.

7. The method of treating chloramine for preventing its premature reaction which includes the steps of converting the chloramine to particles of desired shape and size and coating said particles with a protective coating of sodium stearate.

8. The method which comprises associating chloramine with another ingredient and preventing their premature reaction which includes the steps of converting the chloramine to particles of desired shape and size and coating said particles with a protective coating of sodium stearate.

9. The method of treating chloramine for preventing its premature reaction which includes the steps of converting the chloramine to particles of desired shape and size, coating said particles with a protective coating of sodium stearate and forming the chloramine so treated into a tablet.

10. The method which comprises associating chloramine with another ingredient and preventing their premature reaction which includes the steps of converting the chloramine to particles of desired shape and size, coating said particles with a protective coating of sodium stearate and forming the chloramine so treated into a tablet.

WARNER F. WILHELM.